Patented Aug. 27, 1946

2,406,650

UNITED STATES PATENT OFFICE 2,406,650

METHOD FOR THE EXTRACTION OF CASEIN FROM SEEDS

Robert Louis Wormell, Coventry, England, assignor to Courtaulds Limited, London, England, a British company No Drawing. Application December 30, 1944, Serial No. 570,792. In Great Britain March 16, 1944

5 Claims. (Cl. 260—112)

This invention relates to an improved method for the extraction of alcohol-insoluble casein from seeds.

It is known that alcohol-insoluble casein may be extracted from seeds containing the same (for example, bean or pea meal, nut meal and the like) by the action of alkalies, for instance dilute aqueous solutions of caustic soda or potash, sodium carbonate, ammonia or borax. Such extracts, however, usually contain only small concentrations of the order of 1 per cent or less, and in order to obtain more concentrated solutions of reasonable purity it is generally necessary first to centrifuge or separate out in some way the highly swollen particles of cellulose, starches and muco-polysaccharides which are present in the extract and then to precipitate the casein by acidifying the resulting liquid, which casein is afterwards redissolved in a suitable solvent.

I have now found that by treating seeds containing alcohol-insoluble casein with a solution containing an alkaline reagent, water and less than 40 per cent by volume of a water-miscible organic solvent and then separating the solution from the undissolved residue, the casein can be extracted from the seeds in the form of a concentrate of relatively small bulk. Such concentrates may, for instance, contain 15 per cent or even more of protein matter and may be suitable without further concentration, for conversion into threads either directly or preferably after increasing their viscosity by heating or other suitable treatment. Concentrates of the type described herein may serve as sources of industrial casein.

The seeds are conveniently used in the form of oil-free meal and the extraction may be carried out at atmospheric temperatures or slightly above. In the case of seeds containing any significant quantity of extractable oil, saponification of such oil should be avoided as far as possible by employing as the alkaline reagent only relatively weak solutions of alkali. Alcohol and acetone are examples of suitable organic solvents and the optimum relative quantities required may vary somewhat according to the nature of the seed and the particular solvent chosen but may conveniently be of the order of 20 per cent by volume of the total quantity of liquid employed but must be less than 40 per cent, since increasing proportions of the solvent decrease the solubility of the casein. The separation of the concentrate from the insoluble residue may be effected by centrifuging.

The following examples will illustrate the nature of this invention which, however, is not restricted to these examples.

Example 1

150 grams of oil-free earth-nut meal are mixed with 287 cubic centimetres of distilled water and 13 cubic centimetres of ammonium hydroxide solution of specific gravity 0.880. The mixture is rolled in a bottle for 16 hours at 35° centigrade and 50 cubic centimetres of acetone are then added, followed by a thorough agitation. The pasty mass thus produced is centrifuged when a solution containing 17 per cent of protein separates.

Example 2

50 grams of oil-free soya bean meal are mixed with 96 cubic centimetres of water and 4 cubic centimetres of ammonium hydroxide solution of specific gravity 0.880. The mixture is rolled in a bottle for 16 hours at 35° centigrade and there are then added 17 cubic centimetres of acetone which is thoroughly stirred into the mass. The pasty mass thus formed is centrifuged for 40 minutes when 31 cubic centimetres of a protein solution are recovered; this solution, upon evaporation leaves behind 14 per cent of its weight of protein residue.

Example 3

50 grams of oil-free soya bean meal are treated as in Example 2, but 17 cubic centimetres of ethyl alcohol are used in place of the acetone. The extract obtained contains between 14 per cent and 15 per cent of dissolved matter of which 90 per cent is protein.

Example 4

50 grams of oil-free arachis meal are mixed with 100 cubic centimetres of aqueous caustic soda solution containing 0.5 gram of alkali. The mixture is rolled in a bottle for 4 hours at 35° centigrade, and left at room temperature for 16 hours. 17 cubic centimetres of acetone are then stirred well into the mass. The mixture is centrifuged for 40 minutes, when 28 cubic centimetres of a 14 per cent solution of protein are recovered.

Example 5

1 kilo of oil-free ground nut (arachis) meal is mixed with 1900 cubic centimetres of distilled water and 80 cubic centimetres of ammonia solution of specific gravity 0.880 for 8 hours at 18° centigrade, the pH of this ammoniacal liquor before addition to the meal being about 11.5. 340 cubic centimetres of acetone are added and the mixing continued for another hour. The mass is then centrifuged when 600 cubic centimetres of clear extract having a pH of about 10 and containing 24 per cent of total solids is obtained. 1 per cent of phenol is dissolved in a portion of this solution and the mixture heated and stirred for about an hour at 60° to 70° centigrade when its viscosity increases sufficiently on cooling and re-centrifuging for it to become spinnable. If desired the viscosity may also be increased by any suitable method, for example removal of the solvent by evaporation or reduction of the alkalinity. Filaments are obtained from such solutions by extrusion through a metal jet into a bath containing in 1 litre:

|  | Grams |
|---|---|
| Sulphuric acid | 90 |
| Sodium sulphate | 360 |

The spun fibre may be hardened or otherwise after-treated according to any of the known processes for treating casein fibres.

The small quantity of phenol used according to this example acts as a preservative and is particularly desirable if the casein solution is to be retained for more than a few hours before being spun. The phenol also tends to increase the viscosity of the solution.

What I claim is:

1. A process for the extraction of alcohol-insoluble casein from seeds containing the same which comprises the treatment of the said seeds with a solution containing an alkaline reagent, water and acetone, said acetone being less than 40 per cent by volume of said solution and then separating the solution from the undissolved residue.

2. A process for the extraction of alcohol-insoluble casein from seeds containing the same which comprises the treatment of the said seeds with a solution containing ammonia, water and acetone, said acetone being less than 40 per cent by volume of said solution and then separating the solution from the undissolved residue.

3. A process for the extraction of alcohol-insoluble casein from seeds containing the same which comprises the treatment of the said seeds with a solution containing an alkaline reagent, water and an organic liquid chosen from the group consisting of acetone and water-miscible monohydric alcohols, said organic liquid being less than 40% by volume of said solution, and then separating the solution from the undissolved residue.

4. A process for the extraction of alcohol-insoluble casein from comminuted and substantially oil-free seeds containing the same which comprises the treatment of the said seeds with a solution containing an alkaline reagent, water and an organic liquid chosen from the group consisting of acetone and water-miscible monohydric alcohols, said organic liquid being less than 40% by volume of said solution, and then separating the solution from the undissolved residue.

5. A process for the extraction of alcohol-insoluble casein from oil-free arachis meal which comprises the treatment of the said meal with a solution containing an alkaline reagent, water and an organic liquid chosen from the group consisting of acetone and water-miscible monohydric alcohols, said organic liquid being less than 40% by volume of said solution, and then separating the solution from the undissolved residue.

ROBERT LOUIS WORMELL.